United States Patent Office 3,667,926
Patented June 6, 1972

3,667,926
METHOD FOR COATING GLASS
Larry Q. Green, Wilmington, Del., and Larry L. Light, Kinnelon, N.J., assignors to E. I. du Pont de Nemours and Company, Wilmington, Del.
No Drawing. Filed Nov. 6, 1969, Ser. No. 874,690
Int. Cl. C03c 17/10
U.S. Cl. 65—60
12 Claims

ABSTRACT OF THE DISCLOSURE

Method of producing scratch resistance on glass by contacting it while hot with (a) an aqueous solution of a water-stable titanium composition and (b) an aqueous dispersion of a surface lubricating composition, the glass temperature being high enough to cause immediate and substantially complete vaporization of the water content of the solution and dispersion.

This invention relates to processes for applying aqueous titanium compositions to hot glass, especially for the purpose of imparting scratch resistance thereto.

BACKGROUND

The strength of glass depends chiefly on its existence with unblemished surfaces. Scratches, crevices or other flaws in glass surfaces decrease the strength of glass down to as little as one-fourth of the original glass strength. When glass articles such as bottles, jars, tumblers and the like are first formed, they have their maximum strength. Subsequent to their formation, however, such articles lose their strength as a result of scratching and abrasion as these articles contact each other during filling, capping and packaging of the articles in groups. According to the particular products with which they are filled, such glass articles may also be subjected to washing, sterilizing or vacuum treatments, resulting in added jostling of glass against glass.

Glass bottles are made in the following manner. A melt of the glass is blowformed into bottles, one at a time, at close to the melting point of the glass. The glass used has a melting temperature above 1000° F. The individual bottles are moved away from the blow forming operation into a rectangular array of bottles in the stand-up position. This array is then moved through a cooling lehr in which as it moves the rate of cooling is limited, and it leaves the lehr at a temperature of 400°–500° F. Beyond this point the array is allowed to cool as is natural in the surrounding atmosphere.

Cooled bottles may be gathered for packing at this time prior to storage or for immediate use. To use the bottles they are arranged on a conveyor belt in banks or rows. They move through a series of stations at each of which the bottles are appropriately processed until glass enclosed product is removed at the final station.

Conveyors have an established capacity to move bottles at a given rate. In practice, however, this capacity proves to be just an ideal. This established capacity is often significantly reduced by a discontinuous need to remove bottles from the conveyor when they have broken. Usually the cause of breakage is lost bottle strength from the effects of jostling. Such bottle failures reduce the rate of production of bottle filling machinery and increase the cost of bottled product because product lost by breakage must be paid for in product sold. In addition, bottling machinery with added capacity is required to offset production lost by bottle breakage.

Obvious advantages accrue when bottles used have more reliable strength qualities. Faster production results in processing lines where they are used. Reduced losses of bottles and product enable reduced costs per unit of saleable product because a higher percentage of saleable bottled product is recovered. Less machinery is required because it can operate nearer to its established capacity.

Prior methods have established that maintaining the strength of glass bottles is a corollary to increasing the resistance of their surfaces of scratching. In general, two methods of producing scratch resistance with titanium containing compounds have been used.

It is known to produce scratch resistance on glass surfaces by applying pyrolyzable titanium compounds to glass after it has been melt-formed, but above the pyrolyzing temperature of the titanium compound, followed by the application of certain other compounds after the glass has partially cooled.

In one method the titanium compounds are applied as vapor under anhydrous conditions or are sprayed as solutions in organic solvents onto the hot glass surfaces. After the titanium treated surface has cooled somewhat, a coating of certain organic compounds is applied to complete the treatment to produce scratch resistance of the glass.

The organotitanium compounds of the prior art are highly susceptible to hydrolysis, particularly at the elevated temperatures employed. The eventual effect on the treated glass is that not all of its surface has improvement in scratch resistance because local hydrolysis makes the coating with titanium compounds uneven.

Another method for producing scratch resistant coating on glass involves applying to the glass, while it is cool, an aqueous solution of certain water soluble organotitanium compounds. The glass is then heated to at least its annealing temperature, cooled and, immediately after cooling, allowed to stand at rest in open air for at least 30 minutes or an organic compound is applied to avoid a need for standing. The aqueous solution is applied to the cool glass rather than to hot glass to avoid breakage of the glass by shattering.

Such processes are disclosed in U.S. Pat. Nos. 3,051,-593; 3,130,071; 3,161,531; 3,161,534; 3,161,535; 3,161,-536; 3,161,537 and 3,004,863.

This latter method has certain disadvantages. It requires the reheating of glass once formed and cooled to the pyrolysis temperature of the titanium compound applied thereon. This requires extra provision of energy, time, space and equipment for the reheating of the cool glass and, where applicable, for the recooled glass to stand at rest.

The desirability of the use of an aqueous solution of a titanium compound rather than an organic compound solution thereof is recognized in U.S. Pats. 3,004,863 and 3,051,693. However aqueous solutions were applied only on cool glass.

BRIEF SUMMARY OF THE INVENTION

The present invention relates to a method of treating glass which includes contacting the glass while hot with an aqueous solution of a water-stable titanium composition, the temperature of the hot glass being high enough to immediately and substantially completely vaporize the water content of the solution; and more especially, to a method of producing scratch resistance on glass wherein the hot glass is further contacted, in a subsequent step or from a common aqueous medium, with an aqueous dispersion of a surface lubricating composition, the temperature of the glass being sufficient to immediately and substantially completely vaporize the water content of both the solution and the dispersion, the amounts of the compositions being sufficient to produce a scratch resistant coating on the glass.

DETAILED DESCRIPTION OF THE INVENTION

It has now been discovered that aqueous titanium compositions can be applied to the glass while hot without shattering it, provided it is so applied that the water content vaporizes substantially as soon as it is applied and vaporizes substantially completely. It also has been found that it is not necessary to attain annealing temperatures in glass bearing the titanium composition to produce scratch resistance. The application of a supplementary lubricating composition to the still hot glass in combination or in sequence with the titanium composition completes the treatment to produce scratch-resistant glass.

The method of this invention involves applying an aqueous solution of a titanium composition on hot glass, the hot glass having a temperature sufficiently high to substantially immediately and completely vaporize the water content of the solution. The glass temperature may be as high as an annealing temperature, e.g., 700° F. to 1300° F. or it may be only as high as just above the boiling point of water, e.g. about 210° to 300° F. The amount of aqueous solution to be applied should be no more than the amount which leaves the glass substantially dry after water has stopped vaporizing from the glass. By this guide it is possible to treat the glass with an aqueous solution of a titanium composition without causing the glass to shatter. This ability to treat hot glass with aqueous solutions of titanium compositions is unexpected in the light of prior teachings which suggest that aqueous medium, due to the much higher heat of vaporization of water than organic solvents, have a strong tendency to cause surface cracking in glass treated with it.

Titanium compositions can be applied on glass by the method of this invention for various purposes. It might provide a reflective finish on the glass, be a preliminary for the adhesion of some overlay, provide a label binding finish or the like. However, this invention is most specifically directed to the application of titanium compositions in the production of scratch resistance on glass.

The method of this invention provides for producing scratch resistance on glass by treating hot glass with the titanium compositions and supplementary lubricating compositions (described more fully below) in aqueous media while the glass is hot enough to immediately and substantially completely vaporize the water content of these compositions, the amounts of these compositions applied being sufficient to produce a scratch resistant coating on the glass. Good scratch resistance is attained when the glass is also treated with an aqueous dispersion of a supplementary composition in the same manner. The glass temperature may be as low as 200° F. and may be as high as the supplementary composition can exist without decomposition (generally about 550°–600° F.). However, when the supplementary composition is applied to the hot glass, it too, should immediately vaporize its water content with no running on the glass.

Good scratch resistance can be attained when the aqueous titanium composition is applied at a high glass temperature, e.g., at 900° F., and the supplementary composition is applied at some lower temperature. However, it is not necessary that glass being treated by the application of titanium solutions be as hot as has been previously required.

In one important embodiment of this invention, there is sequentially applied the aqueous solution of titanium composition at glass temperatures in the 300° to 750° F. range and the aqueous dispersion of the supplementary composition in the 200° to 450° F. range. More preferred for the sequential method is that the titanium composition be applied at the higher glass temperature, for instance in the 300°–475° F. range, followed by the application of the supplementary composition at a lower glass temperature, for instance in the 200°–450° F. range. Most preferred temperatures are 375°–425° F. for treating with titanium composition and 300°–375° F. for subsequent treatment with the supplementary composition.

The method of this invention for achieving scratch resistance also includes a one step procedure in which the titanium composition and the supplementary composition are applied from a common aqueous medium. In this embodiment the titanium solution bearing dispersed supplementary composition is normally applied to glass having a temperature in the 200°–475° F. range, with 325°–375° F. being a preferred range.

The relatively low temperature usable in the process of this invention is not alleged to produce films or coatings on glass surfaces identical with those produced by exposing titanium containing compounds to glass surfaces having temperatures at least as high as the pyrolysis temperatures of the titanium compounds. Indeed, it is believed, though not yet proven, that titanoxy groups attached to glass treated by the process of this invention may still have attached organic groups. The presence of such organic groups may bear a new inter-relation to the surface lubricant which also is applied in the supplementary composition on the glass. Regardless, however, of the theory, satisfactory scratch resistance of glass is attained by this process without the need for high glass temperatures previously required in contact with titanium compounds.

While treatment of the hot glass with aqueous media can be by any useful technique, it has been found that application of the aqueous compositions by spraying is the preferred technique.

Techniques used for spraying are well known in the art. The essential consideration of spraying is the complete and even coverage of glass surfaces being treated. Airless sprays impelled by hydraulic pressure can be used for this process. Also effective are sprays impelled as fine droplets by released compressed air. Sprays for either of these methods need to be dilute in terms of the useful compounds they carry so that the necessary complete and even coverage of the glass is attained on the immediately contacted surface. Little allowance can be given for levelling by spatter on glass surfaces, since the sprays dry at contact with hot glass.

Although the titanium compositions used vary in their ability to contribute to scratch resistance on glass their required amounts are small. In their treatment of glass, they contribute to a coating having a thickness normally ranging from about 0.1 to about 1 micron thick. The titanium compositions can be applied as aqueous solutions of about 0.1% to 10% by weight concentrations according to the titanium composition used and the amount of scratch resistance desired. The amount applied will vary as the treating time and will, in combination with the concentration of the solution be proportional to the product of these factors. However, the solution should not be applied to the extent that it runs on the glass. Rather than add too much solution the concentration of the solution should be increased.

The amount of titanium composition needed for scratch resistance is small. To spray a feed of 111 ten fluid ounce soft drink bottles per minutes and produce scratch resistance, requires a spray rate of about one to two gallons of solution containing the titanium content of 0.09 to 0.34 pound per hour of tetraisopropyl titanate. The hourly needs of surface lubricating composition will run somewhat less in terms of the compounds in dispersion. Scratch resistance for a given thickness of coating varies with the size and shape of the bottles.

Spraying of the glass with only the solutions of the titanium containing compounds at the glass surface temperatures of this invention does not normally produce enough improvement in scratch resistance of glass to be useful. Application of the supplementary compound in accordance with the method of this invention is also required for satisfactory scratch resistance.

It is possible to produce some dry scratch resistance on glass by treating it only with a dispersion of the supplementary compound. However, when these glass surfaces are wet with water, this scratch resistance falls to essentially nil. Thus, only by applying both the titanium compound and the supplementary compound is a useful improvement of the wet and dry scratch resistance of glass accomplished.

Useful compounds in the supplementary surface lubricating compositions are applied in amounts normally ranging from about 10% to about 200% of the amount of the titanium composition. Normal concentrations of dispersions applied in the method of this invention range from about 0.01% to about 0.5% of dispersed material in order to achieve good homogeneous dispersion.

A typical application of the two-step method of this invention to produce scratch resistant bottles is described below.

Two twenty-gallon holding tanks were set up just outside the cold end of the lehr in a bottle making machine. Soft drink bottles were moved through the lehr in rows of twenty-four, spread across a four foot span, at an average rate of 100–110 bottles per minute. Two sets of twin air spray nozzles spaced about 2½ feet apart were mounted 6–10 innches above the bottle top and well moved back and forth across the direction of motion of the bottles, with spraying steady except during moments of reversal, at a spray traveler speed of two feet per second. Air was provided to the spray nozzles at 2.8 cubic feet per minute from a 38–42 p.s.i.g. air pressure source. Bottle temperature at the first pair of spray nozzles was 435°–450° F. and at the second pair of spray nozzles was 400°–435° F.

The first pair of nozzles sprayed, from a holding tank at room temperature, an aqueous solution made by mixing one part by weight tetraisopropyl titanate with two parts glacial acetic acid and then diluting this mixture with 97 parts water.

The second pair of nozzles sprayed, from the other holding tank, a room temperature dispersion made by dispersing two parts of an aqueous dispersion containing 14.4% polyethylene, 3% potassium oleate, 2.6% triethanolamine and 1.5% tetrasodium pyrophosphate in 98 parts water.

Satisfactory scratch resistance was obtained on the bottles treated as described above.

This method is easily varied to provide for a single pair of nozzles spraying the titanium composition and the supplementary composition together. The choice of bottle temperatures can be altered by repositioning the spraying assembly.

The titanium compositions

Aqueous solutions used for this method can contain one or more of a variety of water-stable titanium compositions. By water-stable is meant the capability to remain as a clear solution for an extended time, e.g., two days or longer. The aqueous solutions can be any of those disclosed in the art for coating titanium on glass.

An example of such a titanium composition is a lactic acid complex of titanium. Such a composition can be prepared by reacting a tetraalkyl titanate (of 3 to 8 carbon atoms per alkyl group), preferably tetraisopropyl or tetrabutyl titanate, with an aqueous solution of lactic acid, as disclosed in U.S. Pat. No. 3,130,071. It can also be prepared by reacting titanyl sulfate with lactic acid as described in U.S. Pat. No. 2,926,183. The lactic acid complex of titanium made by any other method would be equally useful in this invention.

Another kind of titanium composition useful in this invention is a water-soluble titanium ester of an alkanolamine having the formula

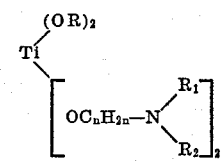

wherein $n$ is 2, 3 or 4 and R, $R_1$ and $R_2$ are members of the group consisting of hydrogen, $C_{1-3}$ alkyl and $C_{2-3}$ hydroxyalkyl. Such esters and methods of preparing them are disclosed in U.S. Pats. 3,051,593 and 2,824,114.

Another kind of useful titanium composition is a titanium ester derivative of an alpha-acyl-acetone or of an acetoacetic acid ester. Such a composition is disclosed in U.S. Pat. No. 3,004,863. However, this kind of composition requires additional preparation for a water-stable solution. If a composition made according to U.S. Pat. No. 3,004,863 is mixed with twice its weight of a water-soluble ketone, e.g., methyl ethyl ketone, the resulting mixture is miscible with water. The water must be added initially in small increments with stirring to the ketone mixture so that clouding is dissipated, and eventually a point is reached where no clouding occurs by the further addition of water. Aqueous solutions made in this fashion remain clear at room temperature indefinitely.

Another kind of titanium composition devised especially for this method is a reaction product of a mole of a tetraalkyl ($C_1$ to $C_8$ alkyl or higher) titanate, preferably a $C_3$ to $C_8$ titanate, e.g., tetraisopropyl or tetrabutyl titanate, with at least four moles, preferably with six or more moles, of a water miscible monocarboxylic acid, e.g., acetic acid. Such a reaction product can be made by simply mixing the tetraalkyl titanate with the concentrated monocarboxylic acid. This mixture can then be diluted with water to produce a solution containing ½% by weight of the tetraalkyl titanate which stays clear at room temperature for 6–14 days.

The solubility requirement of the titanium-compositions is merely that they produce a stable solution which can be applied cold or hot on hot glass. While the above mentioned titanium compositions can produce room temperature solutions of ten percent concentration such compositions need only be sufficiently soluble to form a clear solution, usually containing about 0.1% to about 2% titanium compound for the treatment of hot glass.

The supplementary surface lubricating composition

Supplementary compositions for application on glass in combination with titanium compositions contain surface active agents and a lubricant which can be selected from a variety of organic compounds. Such lubricant compounds, in general, are solids at temperatures as low as 100° F., are insoluble in water, are not wetted by plain water, but are dispersible therein with the help of surface active compounds. At the temperature of hot glass on which they are applied these compounds are liquids.

Useful lubricant compounds include natural fats and waxes such as beeswax, spermaceti wax, carnauba wax, Japan wax, palm wax, lignin wax, hydrogenated castor oil, hydrogenated tallow glyceride and hydrogenated fish oil. This is an especially useful group of compounds.

Another useful group of compounds is the long chain ($C_{10}$ and higher) fatty acids, especially stearic acid, and their water-insoluble metal salts (e.g., calcium stearate). Poly(hydroxytitaniumstearate) is also useful.

Also useful are simple amides of saturated $C_8$ and higher fatty acids, e.g., stearamide and palmitamide.

Esters of fatty acids such as stearic acid may also be used, exemplified by the monostearate of glycerine, the monostearate of diethylene glycol, the monostearate of polyethylene glycol, and the distearate of polyethylene glycol.

Polyethylene waxes are preferred lubricating compounds in the process of this invention. Rather than necessarily being compounds providing the best lubricating property, they are preferred as compounds most readily available in dispersed form ready for use. Polyethylene waxes ranging between molecular weights of about 1,200 and 10,000 can be used. Polyethylene waxes in this molecular weight range are readily emulsifiable. Higher molecular weight polyethylene waxes tend to decompose rather than melt at atmospheric pressure when heat is applied so they are less desirable to the process of this invention.

A preferred polyethylene wax used to make commercial dispersions of polyethylene is exemplified by AC629, a commercially available polyethylene. The supplier gives the following specifications for this material.

Melting point (by procedure ASTM D-87-42) _____ °F__ 208–212
Penetration (100 gm., 5 sec. 77° F.) _____ 2.5–3.5
Acid number _____ 11–15
Saponification number _____ 11–15

U.S. Patent No. 2,965,596 discloses a dispersion of polyethylene which dispersion is the basis for a commercial product made by the assignee under the trade name "Armacote." The formulation in the patent is as follows:

AC polyethylene No. 629 (M.W. 1500–10,000)
    pounds__ 1.6
Potassium oleate _____ ounces__ 5.25
Triethanolamine _____ do____ 4.7
Tetrasodium pyrophosphate _____ do____ 2.5

The first three ingredients are added to sufficient hot water to form a dispersion having a solids content of about 20%. The pyrophosphate is then added to this dispersion.

U.S. Pat. No. 2,995,533 discloses a dispersion of polyethylene which dispersion is the basis for a commercial product made by the assignee under the trade name "Duracote." The formulation in the patent is as follows:

Parts
AC Polyethylene No. 629 (M.W. 1200–2000) ____ 40
Oleic acid (USP) _____ 11
Potassium hydroxide _____ 2
Distilled water _____ 207

Molten oleic acid at 230° F. is added to molten polyethylene having a temperature of 230°–245° F. The potassium hydroxide as a hot 60% aqueous solution is slowly added to the mixed melt. The resulting hot product is carefully added to the water having a temperature of 200 to 210° F.

As mentioned before, it is necessary that the organic compounds in the supplementary composition be dispersible with the help of surface active agents. Surface active agents used to disperse the organic compounds may be anionic, nonionic or cationic and they should be chosen to be or adjusted to be compatible with the titanium composition when they are used in the one step method.

Typical of the anionic surface active agents are the alkali metal salts of the sulfate esters of $C_8$ to $C_{20}$ fatty alcohols and alkali metal salts of sulfonic acids of $C_{12}$ to $C_{20}$ aliphatic hydrocarbons. Ammonium and alkali metal soaps of $C_{12}$ or higher saturated and unsaturated fatty acids may be used, potassium oleate and sodium stearate being especially effective.

In the nonionic dispersants, ethylene oxide adducts are effective. Polyoxyethylated fatty $C_{12}$ to $C_{20}$ alcohols, such as the adduct of lauryl alcohol and 10–20 mole equivalents of ethylene oxide may be used. Polyoxyethylene sorbitan monostearate, sold as "Tween" 60 and as "Tween" 61, as well as polyoxyethylene sorbitan monooleate, sold as "Tween" 80, are useful dispersants for the supplementary compounds.

An example of a useful cationic dispersant would be a long chain ($C_{14}$ or higher amine) such as dodecylamine hydrochloride or a quaternary amine derivative such as tetradecyl trimethyl amine acetate.

Where the titanium-containing compositions are acidic, such as from the presence of free organic acid, a need exists to make dispersions of surface lubricating organic compounds compatible with the titanium containing compositions. An anionic dispersant can be deactivated by free organic acid unless a dispersant which maintains its dispersing action in acidic medium is present. This difficulty can be overcome by incorporating a nonionic dispersing agent when mixing acidic titanium containing compositions and anionic dispersions of lubricating compounds. Another way to avoid this difficulty is to use a lubricating compound dispersed with a cationic dispersing agent or dispersed solely with a nonionic dispersing agent.

EXAMPLES

The subsequent examples illustrate the method of this invention. Proportional parts in the treating liquids used are by weight. The sign > signifies greater than.

EXAMPLES 1–18

Commercially available 21 mm. diameter by 70 mm. long cylindrical glass vials were heated in a 375° F. oven until they were in temperature equilibrium with the oven. Heated vials, one at a time, just withdrawn from the oven were immediately sprayed with titanium-containing solutions for two seconds while the vials were being rotated about their axes at several revolutions per second. Pairs of vials were prepared for each variation tested. Each sprayed vial was immediately put back in the 375° F. oven for ten minutes.

Thereafter each pair of vials was removed, one at a time, from the oven, immediately sprayed while hot with dispersions of supplementary compositions while the vials were rotated as before and immediately put back again in the oven. After 10 minutes they were removed for cooling.

Spraying of the vials was done with a Binks "Wren B" airgun.

The cooled pairs of vials were tested for dry scratch resistance and wet scratch resistance by the following test method. One of each pair was drawn along its axis at a right angle over the axis of the other of the pair so that the exterior cylindrical surface of one rubbed the exterior cylindrical surface of the other. A measured loading was put on the top vial for a first pass. Failing to scratch either vial the loading was raised 5 pounds, and with new surfaces exposed the upper vial was again drawn across the lower vial. When a loading was reached at which a scratch occurred on a vial or when a minimum desired loading was reached without a scratch beyond which no higher loading was tested the scratch resistance value was expressed as the value of the highest prior "no scratch" test or as a "greater than" scratch resistance value, respectively. Failure at the 5 pound loading received a zero scratch resistance value. Values for the dry vials were determined first and then values were determined while the vials were wet with water.

| Example Number | Blank | 1 | 2 | 3 | 4 | 5 | 6 control |
|---|---|---|---|---|---|---|---|
| First step | None | | | | | | |
| Water | | 97.0 | 97.0 | 97.0 | 97.0 | 97.0 | 97.0 |
| Acetic acid [1] | | 2.0 | 2.0 | 2.0 | 2.0 | 2.0 | 2.0 |
| TPT [2] | | 1.0 | 1.0 | 1.0 | 1.0 | 1.0 | 1.0 |
| Second step | None | | | | | | None |
| Water | | 99.7 | 99.7 | 99.7 | 99.2 | 99.0 | |
| Beeswax | | 0.176 | | | | | |
| Japan wax | | | 0.22 | | | | |
| Hydrogenated castor oil | | | | 0.22 | | | |
| Poly(hydroxytitanium stearate) [3] | | | | | 0.38 | | |
| "Armacote" | | | | | | 1.0 | |
| Toluene | | | | | 0.37 | | |
| Sodium stearate | | 0.107 | 0.13 | 0.13 | | | |
| Sodium C$_{10-18}$ alcohol sulfate [4] | | | | | 0.04 | | |
| Scratch resistance dry, lbs | 0 | >20 | >20 | >20 | >20 | >20 | 0 |
| Scratch resistance wet, lbs | 0 | >20 | >20 | >20 | >20 | >20 | 0 |

[1] Acetic acid is amount mixed with TPT before dilution with water.
[2] TPT is tetraisopropyl titanate.
[3] Has the formula HO[RCOOTi(OH)O]$_n$OH.
[4] Sodium alcohol sulfate is made from a predominantly C$_{12}$ fatty alcohol and sodium sulfate.

The procedure of Examples 1–6 was followed except that 1.0 part of tetraisobutyl titanate replaced 1.0 part of tetraisopropyl titanate in each example. The following results were obtained:

| Example Number | Lubricant of example number | Scratch resistance, lbs. Dry | Wet |
|---|---|---|---|
| 7 | 1 | >20 | >20 |
| 8 | 2 | >20 | >20 |
| 9 | 3 | >20 | >20 |
| 10 | 4 | >20 | >20 |
| 11 | 5 | >20 | >20 |
| 12 control | None | 0 | 0 |

The procedure of Examples 1–6 was followed except that 1.0 part of the reaction mixture of one mole of tetraisopropyl titanate and two moles acetylacetone replaced 1.0 part of tetraisopropyl titanate and 2.0 parts acetic acid were replaced by 2.0 additional parts of methyl ethyl ketone in each example. The following results were obtained:

| Example Number | Lubricant of example number | Scratch resistance, lbs. Dry | Wet |
|---|---|---|---|
| 13 | 1 | >20 | >20 |
| 14 | 2 | >20 | >20 |
| 15 | 3 | >20 | >20 |
| 16 | 4 | >20 | >10 |
| 17 | 5 | >20 | >10 |
| 18 control | None | 0 | 0 |

EXAMPLES 19–22

Pairs of 21 mm. x 70 mm. cylindrical glass vials were heated in a 375° F. oven until they were in temperature equilibrium with the oven. Heated vials, one at a time, just withdrawn from the oven were immediately sprayed with titanium containing solutions bearing dispersed supplementary composition for two seconds while the vials were being rotated about their axes at several revolutions per second. Pairs of vials were prepared for each variation tested. Each sprayed vial was immediately put back in the 375° F. oven for ten minutes.

Thereafter each pair of vials was removed and allowed to cool. The cooled pairs of vials were then tested for dry and wet scratch resistance by the test method used for Examples 1–18.

| Example number | Blank | 19 | 20 | 21 | 22 |
|---|---|---|---|---|---|
| Water | | 96.0 | 96.0 | 98.0 | 98.0 |
| Acetic acid | | 2.0 | 2.0 | | |
| TPT | | 1.0 | | | |
| TBT [1] | | | 1.0 | | |
| LA [2] | | | | 1.0 | |
| TE [3] | | | | | 1.0 |
| "Armacote" | | 1.0 | 1.0 | 1.0 | 1.0 |
| Oleyl alcohol: 20 ethylene oxide adduct | | 0.05 | 0.05 | | |
| Scratch resistance dry, lbs | 0 | >20 | >20 | >20 | >20 |
| Scratch resistance wet, lbs | 0 | >20 | >20 | >20 | >20 |

[1] TBT = tetrabutyl titanate.
[2] LA = precipitated product from reaction of TPT and aqueous lactic acid in cyclohexane.
[3] TE = ester of titanium with two moles isopropyl alcohol and two moles triethanolamine.

EXAMPLES 23–24

Pairs of 21 mm. x 70 mm. glass vials were cleaned by heating them to 900°±100° F. and then they were brought into temperature equilibrium with a 300° F. oven. Thereafter they were treated as in Examples 1–18 except that a 300° F. oven was used.

Scratch resistance was tested by the method used for Examples 1–18.

| Example number | 23 | 24 | 25 | 26 | 27 | 28 |
|---|---|---|---|---|---|---|
| First step: | | | | | | |
| Water | 99.25 | 99.25 | 98.5 | 98.5 | 97.0 | 97.0 |
| MEK [1] | 0.5 | 0.5 | 1.0 | 1.0 | 2.0 | 2.0 |
| AA [2] | 0.25 | 0.25 | 0.5 | 0.5 | 1.0 | 1.0 |
| Second step: | | | | | | |
| Water | 99.0 | 99.0 | 99.0 | 99.7 | 99.0 | 99.7 |
| Beeswax | | 0.176 | | 0.176 | | 0.176 |
| "Armacote" | 1.0 | | 1.0 | | 1.0 | |
| Sodium stearate | | 0.107 | | 0.107 | | 0.107 |
| Scratch resistance dry, lbs | 40 | 40 | 40 | 40 | 40 | 40 |
| Scratch resistance wet, lbs | 40 | 40 | 40 | 40 | 40 | 40 |

[1] MEK = methyl ethyl ketone amount mixed with titanium compound before dilution with water.
[2] AA = ester of titanium with two moles isolpropyl alcohol and two moles acetylacetone.

The procedure of Examples 23–28 was followed except that an equal weight of tetraisopropyl titanate replaced AA and an equal weight of acetic acid replaced MEK. The tetraisopropyl titanate and glacial acetic acid were mixed before being diluted with water. The following results were obtained:

| Example Number | Lubricant of Example Number | Scratch resistance, lbs. | |
|---|---|---|---|
| | | Dry | Wet |
| 29 | 23 | 30 | 30 |
| 30 | 24 | 40 | 40 |
| 31 | 25 | 40 | 40 |
| 32 | 26 | 40 | 40 |
| 33 | 27 | 40 | 40 |
| 34 | 28 | 40 | 40 |

EXAMPLES 35–46

These examples show how the amount of treating agent applied to glass may affect its scratch resistance.

Pairs of 21 mm. x 70 mm. glass vials were treated by the one-step procedure of Examples 19–22 in an oven temperature of 325° F. The amount of time the vials were sprayed was varied as shown.

The vials were tested for scratch resistance by the method used in Examples 1–18.

Three pairs of vials were treated each with spraying preparations made with 0.06 part TE, 0.125 part "Armacote" and 99.3 parts water. Scratch resistance against spray time is shown below:

| Example Number | Spray time, seconds | Scratch resistance, lbs. | |
|---|---|---|---|
| | | Dry | Wet |
| 35 | 2 | 15 | 0 |
| 36 | 4 | 30 | 5 |
| 37 | 8 | >40 | 15 |

Three pairs of vials were treated using sprays consisting of 0.06 part TE, 0.125 part "Duracote" and 99.3 parts water. Scratch resistance against spray time is shown:

| Example Number | Spray time, seconds | Scratch resistance, lbs. | |
|---|---|---|---|
| | | Dry | Wet |
| 38 | 2 | 15 | 0 |
| 39 | 4 | 30 | 5 |
| 40 | 8 | 30 | 5 |

Three pairs of vials were treated using sprays consisting of 0.25 part AA mixed with 0.5 part methyl ethyl ketone, 0.5 part "Armacote" and 98.25 parts water. Scratch resistance against spray time is shown:

| Example Number | Spray time, seconds | Scratch resistance, lbs. | |
|---|---|---|---|
| | | Dry | Wet |
| 41 | 2 | >40 | 30 |
| 42 | 4 | >40 | 30 |
| 43 | 8 | >40 | >40 |

There pairs of vials were treated using sprays of the above composition except that 0.5 part "Duracote" replace the "Armacote." Scratch resistance against spray time is shown:

| Example Number | Spray time, seconds | Scratch resistance, lbs. | |
|---|---|---|---|
| | | Dry | Wet |
| 44 | 2 | >40 | 35 |
| 45 | 4 | >40 | >40 |
| 46 | 8 | >40 | >40 |

Satisfactory wet and dry scratch resistance may also be obtained with shorter spray times by employing more concentrated, e.g., 2–10 times with concentration, solutions of titanium compositions and dispersions of supplementary compositions.

EXAMPLES 47–57

Pairs of 21 mm. x 70 mm. glass vials were temperature equilibrated with a 325° F. oven and treated as in Example 1 for two seconds each vial with titanium containing solutions. The vials were put back in the 325° F. oven for ten minutes.

Thereafter each pair of vials were temperature equilibrated in a different oven according to temperatures given in the table below. Each pair was sprayed with dispersions of 1 part "Armacote" in 99 parts water and returned to the oven for 10 minutes.

After being allowed to cool the vials were tested for dry and wet scratch resistance as in Example 1.

Examples 47–49 used 0.5 part TE in 99.5 parts water for spray in the first step. Examples 50–51 used 0.5 part LA in 99.5 parts water for first step spray. Examples 55–57 used a mixture of 0.5 part TPT mixed with 0.6 part glacial acetic acid diluted with 98.9 parts water for the first step spray.

| Example Number | First step spray | Second step temperature, °F. | Scratch resistance, lbs. | |
|---|---|---|---|---|
| | | | Dry | Wet |
| 47 | TE | 200 | 35 | 15 |
| 48 | TE | 300 | 35 | 15 |
| 49 | TE | 400 | 30 | 15 |
| 50 | LA | 200 | 35 | 15 |
| 51 | LA | 300 | >40 | 15 |
| 52 | AA plus MEK | 200 | 35 | 15 |
| 53 | do | 300 | >40 | 30 |
| 54 | do | 400 | 35 | 15 |
| 55 | TPT plus acetic acid | 200 | >40 | 15 |
| 56 | do | 300 | >40 | 30 |
| 57 | do | 400 | >40 | 25 |

EXAMPLES 58–63

Pairs of 21 mm. x 70 mm. vials were treated by the procedures of Examples 1–18 except that a 350° F. oven was used.

In all of these examples a dispersion of 1 part "Armacote" in 99 parts water was sprayed in the second step.

Scratch resistance tests made by the same procedures are shown below.

| Example number | 58 | 59 | 60 | 61 | 62 | 63 |
|---|---|---|---|---|---|---|
| First step: | | | | | | |
| Water | 99.25 | 98.5 | 97.0 | 99.5 | 98.9 | 97.8 |
| Acetic acid | | | | 0.3 | 0.6 | 1.2 |
| Methyl ethyl ketone | 0.5 | 1.0 | 2.0 | | | |
| TPT | | | | 0.25 | 0.5 | 1.0 |
| AA | 0.25 | 0.5 | 1.0 | | | |
| Scratch resistance dry, lbs | 35 | >40 | 35 | 35 | >40 | 35 |
| Scratch resistance wet, lbs | 15 | >30 | 15 | 15 | 25 | 15 |

EXAMPLES 64–80

These examples show how the amount of treating agent applied on glass may affect its scratch resistance.

Pairs of 21 mm. x 70 mm. glass vials were treated by the one-step procedure of Examples 19–22 but using an oven temperature of 350° F. The amount of time the vials were sprayed was varied as shown.

The vials were tested for scratch resistance by the procedures of Examples 1–18.

| Example Number | Parts of— | | | Spray time, seconds | Scratch resistance, lbs. | |
|---|---|---|---|---|---|---|
| | TE | Water | "Armacote" | | Dry | Wet |
| 64 | 0.06 | 99.7 | 0.25 | 2 | 15 | 0 |
| 65 | 0.06 | 99.7 | 0.25 | 4 | 25 | 5 |
| 66 | 0.06 | 99.7 | 0.25 | 8 | 40 | 15 |
| 67 | 0.125 | 99.6 | 0.25 | 2 | 15 | 0 |
| 68 | 0.125 | 99.6 | 0.25 | 4 | 25 | 5 |
| 69 | 0.125 | 99.6 | 0.25 | 8 | 02 | 5 |
| 70 | 0.25 | 99.2 | 0.5 | 2 | 15 | 5 |
| 71 | 0.25 | 99.2 | 0.5 | 4 | 30 | 5 |
| 72 | 0.25 | 99.2 | 0.5 | 8 | >40 | 5 |
| 73 | 0.5 | 98.5 | 1.0 | 2 | 35 | 15 |
| 74 | 0.5 | 98.5 | 1.0 | 4 | 35 | 15 |
| 75 | 0.5 | 98.5 | 1.0 | 8 | 40 | 15 |
| 76 | 1.0 | 98.0 | 1.0 | 2 | 40 | 15 |
| 77 | 1.0 | 98.0 | 1.0 | 8 | 40 | 15 |

Another series of vials were tested in which a mixture of 0.25 part AA and 0.5 part methyl ethyl ketone, 1.0 part "Armacote" and 98.25 parts water were sprayed using the 350° F. oven.

| Example Number | Spray time, seconds | Scratch resistance, lbs. Dry | Wet |
|---|---|---|---|
| 78 | 2 | >40 | 30 |
| 79 | 4 | >40 | 30 |
| 80 | 8 | >40 | >40 |

Here as in Examples 35–46 it can be seen that scratch resistance of glass can be improved by the use of more treating agents. Satisfactory wet and dry scratch resistance are obtainable by the use of more concentrated treating preparations.

EXAMPLES 81-107

Eastman Projector Slide Cover Glasses (3¼ in. x 4¼ in., product B234) were temperature equilibrated with a 400° F. oven. The hot cover glasses were sprayed separately in the oven for a standard spray time and at a standard spraying distance previously established, using varied compositions defined in the table below as spray material. The standard spray time and distance was previously established as being that combination which coats the 400° F. glass to an extent just less than the extent at which the glass frosts from the spray produced by the richest solution-dispersion tested. Immediately after being sprayed the 400° F. oven was closed for 5 minutes to allow each cover glass to approach the oven temperature, and the glass was removed for cooling.

The treated cover glasses were then tested for scratch resistance. A scratch test consisted of securing the plate on a flat horizontal surface and dragging a 13/16 inch diameter glass sphere secured against rotation across the treated glass surface while an added vertical load is placed on the glass sphere. When a load failed to cause a scratch the load was increased by five pounds and the same glass sphere was dragged across untested surface.

At the point where scratch occurred on the surface tested a scratch resistance value was recorded which was the maximum loading value at which no scratch occurred or if no scratch had occurred at the highest loading value tested the scratch resistance value was recorded as "greater than" that value.

After scratch resistance had been tested on the dry surface the surface was wet with water and while wet the wet scratch resistance was measured.

| Example Number | 81 control | 82 | 83 | 84 | 85 control | 86 | 87 | 88 |
|---|---|---|---|---|---|---|---|---|
| Water | 98.0 | 97.0 | 97.5 | 97.8 | 99.0 | 98.0 | 98.5 | 98.7 |
| LA | 2.0 | 2.0 | 2.0 | 2.0 | 1.0 | 1.0 | 1.0 | 1.0 |
| "Armacote" | | 1.0 | 0.5 | 0.25 | | 1.0 | 0.5 | 0.25 |
| Scratch resistance dry, lbs | 15 | 30 | 5 | 15 | 5 | 35 | 15 | 20 |
| Scratch resistance wet, lbs | 5 | 10 | 5 | 5 | 5 | 15 | 10 | 15 |

The procedure of Examples 80–88 was followed except that an equal weight of TE was substituted for LA in the examples. The results follow:

| Example Number | Lubricant of Example Number | Scratch resistance, lbs. Dry | Wet |
|---|---|---|---|
| 89 | ¹ 81 | 10 | 5 |
| 90 | 82 | >40 | 35 |
| 91 | 83 | >40 | >40 |
| 92 | 84 | 30 | 20 |
| 93 | 86 | 35 | 15 |
| 94 | 87 | 15 | 10 |
| 95 | 88 | 20 | 15 |

¹ None.

The procedure of Examples 89–95 was followed except that a lesser amount of TE was used and slightly more water, equal to the reduction of TE was used in the spray formulation. Results follow:

| Example Number | Parts TE | Lubricant of Example Number | Scratch resistance, lbs. Dry | Wet |
|---|---|---|---|---|
| 96 | 0.5 | 86 | >40 | >40 |
| 97 | 0.5 | 87 | >40 | 35 |
| 98 | 0.5 | 88 | >40 | 35 |
| 99 | 0.25 | 86 | >40 | >40 |
| 100 | 0.25 | 87 | >40 | >40 |
| 101 | 0.25 | 88 | >40 | >40 |

The following combinations also were tested:

| Example Number | 102 | 103 | 104 | 105 | 106 | 107 |
|---|---|---|---|---|---|---|
| Water | 99.3 | 99.5 | 99.6 | 99.5 | 99.7 | 99.8 |
| TE | 0.25 | 0.25 | 0.25 | 0.06 | 0.06 | 0.06 |
| "Armacote" | 0.25 | 0.25 | 0.125 | 0.5 | 0.25 | 0.125 |
| Scratch resistance dry, lbs | >40 | >40 | >40 | >40 | >40 | >40 |
| Scratch resistance wet, lbs | 30 | >40 | >40 | >40 | >40 | >40 |

EXAMPLES 108-126

Slide cover glasses identical to those used for Examples 81–107 were temperature equilibrated with an oven at the temperature indicated below. The hot cover glasses are treated by the one-step method with aqueous sprays containing beeswax emulsified in water containing sodium stearate in the amounts designated and containing dissolved AA-MEK mixture in the amounts designated.

Dry and wet scratch resistance values were determined as in Examples 81–107.

Sprays for Examples 108–112 contained 0.176 parts beeswax and 0.107 part sodium stearate in 93.7 parts water containing a dissolved mixture of 2 parts AA and 4 parts MEK. Sprays for Examples 113–116 had the AA-MEK mixture replaced by an equal weight of water.

| Example number | Spray temperature, °F. | AA-MEK present | Scratch resistance, lbs. Dry | Wet |
|---|---|---|---|---|
| 108 | 212 | Yes | >30 | 15 |
| 109 | 302 | Yes | >30 | 15 |
| 110 | 392 | Yes | >30 | 25 |
| 111 | 482 | Yes | >30 | 15 |
| 112 | 572 | Yes | 25 | 0 |
| 113 | 212 | No | >30 | 0 |
| 114 | 302 | No | >30 | 15 |
| 115 | 482 | No | 25 | 5 |
| 116 | 572 | No | 5 | 0 |

Sprays for Examples 117–126 were like those of Examples 108–116 except that they contained only 0.088 part beeswax and 0.054 part sodium stearate.

| Example number | Spray temperature, °F. | AA-MEK present | Scratch resistance, lbs. Dry | Wet |
|---|---|---|---|---|
| 117 | 212 | Yes | >30 | 15 |
| 118 | 302 | Yes | >30 | 15 |
| 119 | 392 | Yes | >30 | 25 |
| 120 | 482 | Yes | >30 | 15 |
| 121 | 572 | Yes | 25 | 0 |
| 122 | 212 | No | >30 | 5 |
| 123 | 302 | No | >30 | 5 |
| 124 | 392 | No | >30 | 5 |
| 125 | 482 | No | >30 | 0 |
| 126 | 572 | No | 5 | 0 |

EXAMPLES 127-134

Slide cover glasses identical to those used for Examples 81–107 were temperature equilibrated with an oven at the temperature indicated below. The hot cover glasses were sprayed in the oven with a solution containing a mixture of 2 parts AA and 4 parts MEK dissolved in 94 parts water, removed immediately and allowed to cool. When cooled to room temperature they were sprayed with a dispersion of 0.176 part beeswax in 99.7 parts water containing 0.107 part sodium stearate, the amount of accumulated spray on the glass being insufficient to run. The beeswax spraying was allowed to dry at room temperature.

These slides were tested for dry and wet scratch resistance as in Examples 81-107. Thereafter some of these slides were brought to temperature equilibrium in a 203° F. oven and then allowed to recool. Those slides were tested again for wet scratch resistance by the method previously used:

| Example Number | Temperature, °F. at titanium spray | Scratch resistance, lbs. | | |
|---|---|---|---|---|
| | | Dry | Wet | Wet after reheat |
| 127 | 482 | >40 | 25 | |
| 128 | 572 | >40 | 35 | |
| 129 | 662 | >40 | 25 | 25 |
| 130 | 752 | >40 | 25 | 35 |

Additional slide cover glasses were treated like Examples 127-130 except that the titanium spray contained 1 part AA and 2 parts MEK in 97 parts water.

| Example Number | Temperature, °F. at titanium spray | Scratch resistance, lbs. | | |
|---|---|---|---|---|
| | | Dry | Wet | Wet after reheat |
| 131 | 482 | >40 | 5 | |
| 132 | 572 | >40 | 5 | |
| 133 | 662 | >40 | 25 | 35 |
| 134 | 752 | >40 | 15 | 15 |

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The method of producing scratch resistance on glass consisting essentially of contacting the glass while hot with
   (a) an aqueous solution of water-stable organic titanium composition; and
   (b) an aqueous dispersion of a surface lubricating composition;
the temperature of the glass being sufficient to immediately and substantially completely vaporize the water content of said solution and dispersion and the temperature of the glass being at 750° F. or below and below the decomposition temperature of said dispersion; and the amounts of said compositions being sufficient to produce a scratch-resistant coating on said glass.

2. Claim 1 wherein said compositions are sprayed onto said hot glass.

3. Claim 1 wherein the water-stable titanium composition is selected from (1) a reaction product of a $C_{3-8}$ tetraalkyltitanate with a water miscible monocarboxylic acid or an aqueous solution of lactic acid; (2) a water-soluble titanium ester of an alkanolamine having the formula

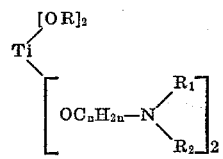

wherein $n$ is 2, 3 or 4 and R, $R_1$ and $R_2$ are selected from hydrogen, $C_{1-3}$ alkyl and $C_{2-3}$ hydroxyalkyl; or (3) a mixture of methyl ethyl ketone and a titanium ester derivative of an alpha-acyl-acetone or of an acetoacetic acid ester.

4. Claim 1 wherein the surface lubricating composition contains a surface active agent and a lubricant selected from natural fats and waxes; poly(hydroxytitaniumstearate); long-chain fatty acid derivatives; and polyethylene waxes having a molecular weight of about 1,200-10,000.

5. Claim 1 wherein the hot glass is sprayed with the titanium and lubricating composition borne in the same aqueous medium.

6. Claim 5 wherein the hot glass is at a temperature of 200°-475° F.

7. Claim 6 wherein said temperature is 325°-375° F.

8. Claim 7 wherein the titanium composition is the reaction product of a $C_{3-4}$ tetraalkyltitanate with glacial acetic acid or a mixture of methyl ethyl ketone and the reaction product of tetraisopropyltitanate with acetylacetone; and the lubricating composition contains a polyethylene wax having a molecular weight of 1,200-10,000 and a surface active agent.

9. Claim 1 wherein the hot glass is sprayed with the solution of titanium in one step and with the dispersion of lubricating composition in a second step.

10. Claim 9 wherein the hot glass temperature is 300°-750° F. in the first step and 200°-450° F. in the second step.

11. Claim 9 wherein the hot glass temperature is 375°-425° F. in the first step and 300°-375° F. in the second step.

12. Claim 11 wherein the titanium composition is the reaction product of a $C_{3-4}$ tetraalkyltitanate with glacial acetic acid or a mixture of methyl ethyl ketone and the reaction product of tetraisopropyltitanate with acetylacetone; and the lubricating composition contains a polyethylene wax having a molecular weight of 1,200-10,000 and a surface active agent.

References Cited
UNITED STATES PATENTS

| | | | |
|---|---|---|---|
| 3,323,889 | 6/1967 | Carl et al. | 65—60 |
| 3,130,071 | 4/1964 | Brockett et al. | 117—124 D |

ARTHUR D. KELLOGG, Primary Examiner

U.S. Cl. X.R.

65—26; 117—88, 92, 124 D